United States Patent [19]

Bock et al.

[11] Patent Number: 4,883,336

[45] Date of Patent: Nov. 28, 1989

[54] METHOD AND LEADTHROUGH SYSTEM FOR LAYING OUT OPTICAL FIBRES ACROSS AN APERTURE OF A CONTAINER SHELL

[75] Inventors: Wojtek Bock; Jacek Chrostowski, both of Gloucester, Canada

[73] Assignee: Conseil National de Recherches du Canada, Ottawa, Canada

[21] Appl. No.: 311,865

[22] Filed: Feb. 17, 1989

[51] Int. Cl.[4] .............................. G02B 6/36; G02B 7/26
[52] U.S. Cl. ................................. 350/96.20; 350/96.22
[58] Field of Search ................. 350/96.20, 96.21, 96.22

[56] References Cited

U.S. PATENT DOCUMENTS

| | | | |
|---|---|---|---|
| 3,825,320 | 7/1974 | Redfern | 350/96 B |
| 3,910,678 | 10/1975 | McCartney et al. | 350/96 C |
| 4,047,797 | 9/1977 | Arnold et al. | 350/96 C |
| 4,108,534 | 8/1978 | Le Noane et al. | 350/96.21 |
| 4,217,028 | 8/1980 | Reh et al. | 350/96.20 |
| 4,360,249 | 11/1982 | Slemon | 350/96.18 |
| 4,610,503 | 9/1986 | Miyazaki et al. | 350/96.20 |
| 4,629,284 | 12/1986 | Malavielle | 350/96.21 |
| 4,712,864 | 12/1987 | Ellis et al. | 350/96.22 |

FOREIGN PATENT DOCUMENTS 2058484A 4/1981 United Kingdom.

OTHER PUBLICATIONS

"Fiber-Optics Imaging of the Interior of Bridgman-Anvil Pressure Chambers", E. N. Yakovlev et al., Sov. Tech. Phys. Lett., Aug. 1983.
"Optical Window Based on Light Guides for a Pressure Chamber", A. M. Shirokov et al., High-Pressure Physics Institute, Academy of Sciences of the U.S.S.R., Dec. 1982.

Primary Examiner—William L. Sikes
Assistant Examiner—Robert E. Wise
Attorney, Agent, or Firm—Foley & Lardner, Schwartz, Jeffery, Schwaab, Mack, Blumenthal & Evans

[57] ABSTRACT

There is disclosed a method and a system for laying out optical fibres across an aperture in a wall separating a high pressure zone from a low pressure zone. It involves a plug member sealingly mounted across the aperture and formed with an axial through fibre passage having a conical first portion and a second portion of constant cross-section. A conical wedge member is freely inserted into the first passage portion and is formed with a series of grooves on its outer surface leading into the second passage portion. A plurality of optical fibres are divided into fractions and each fraction is received into one of the grooves; all fibres being thereafter collected into the second passage portion. Plastics material is introduced in the grooves and in the second passage portion to completely embed the fibres while adhering to the walls of the grooves and of the second passage portion. In this manner, the frictional resistance of the plastics material is greatly increased, allowing an appreciably larger pressure differential between the two pressure zones.

17 Claims, 3 Drawing Sheets

METHOD AND LEADTHROUGH SYSTEM FOR LAYING OUT OPTICAL FIBRES ACROSS AN APERTURE OF A CONTAINER SHELL

BACKGROUND OF THE INVENTION

1. Field of the invention

The present invention relates to a method of laying out optical fibres across an aperture through the shell of a high pressure container or vessel. The invention is also concerned with a leadthrough system capable of allowing passage of the optical fibres through the shell.

2. Description of the prior art

For the past 20 years, high hydrostatic pressures have increasingly been used in laboratories and in industries for experimental, research and manufacturing works. This has led, in particular, to the development of a new class of high quality measuring sensors using optical fibres and to the development of other high pressure components involving optical fibres and serving to transmit information, gathered by the sensors in and out of the pressure chambers into which the sensors are mounted. However, while such sensors could be employed advantageously for measurements in pressure differentials of up to 200 MPa, this has not been possible due to the lack of reliable leadthrough devices capable of retaining optical fibres, particularly in significant numbers, in the bulkheads or shell of high pressure chambers. This limit in working pressures which is imposed by presently available leadthrough devices, also applies, of course, to high pressure optical investigations such as those relating to the characterizations of solids or liquids under pressure.

A high-pressure, submarine leadthrough device of the above type is disclosed in U.K. patent application G.B. No. 2,058,484 published on Apr. 8, 1981. It is the form of a gland having a tubular strength member that is mechanically secured and sealed to the bulkhead of a vessel or container in which the pressure is held at 15,000 psi (104 MPa). The strength member has a straight bore through which optical fibres or electrical conductors are loosely passed; the bore being thereafter filled with an encapsulating plastics material, such as an epoxy resin, which frictionally adheres to both the fibres of conductors and the bore wall over a length of 150 mm. This device is said to withstand pressure differentials of up to 100 MPa but with such embodiment it seems highly improbable. Indeed, below the critical pressure, the axial load generated by the hydrostatic pressure is wholly transferred to the surrounding wall of the strength member across the encapsulating material. Beyond that pressure however, the resisting frictional force of the plastics material breaks down and the fibres or conductors are blown out of the bore.

Also known are low-pressure devices used in submarine signalling systems involving a fibre-optic cable. They are based on the compression of the cable as it passes through an axial core of a metallic compression block.

A search of the prior art has revealed the following U.S. patent Nos. pertaining to leadthrough devices generally of the relatively low pressure type and acting as supports for optical fibres passing through the bulkhead of a pressure vessel or container:
3,825,320 of 1974—REDFERN
4,217,028 of 1980—REH et al.
4,360,249 of 1982—SLEMON
4,682,846 of 1987—COWEN The following other U.S. patent Nos. are listed here as of general interest only:
3,910,678 of 1975—Mc CARTNEY et al.
4,047,797 of 1977—ARNOLD et al.
4,108,534 of 1978—LOANE et al.
4,610,503 of 1986—MIYAZAKI et al.
4,712,864 of 1987—ELLIS et al.
4,097,129 of 1978—WELLINGTON et al.
4,261,640 of 1981—STANKOS et al.
4,312,563 of 1982—MEAD
4,441,786 of 1984—UHLIN et al.
4,589,727 of 1986—Williams

SUMMARY OF THE INVENTION

An object of the invention is to provide a method and a leadthrough system pertaining to the transmission of optical data via fibre lightguides to and from the chamber of a high-pressure vessel or container; the light guides being capable to withstand hydrostatic pressure differentials of up to 200 MPa, that is much greater differentials than those applicable to known systems.

Another object of the invention lies in providing a leadthrough system allowing the passage of up to 20 separate optical fibres carrying output data that may be obtained from a sensor or from samples under investigation, such as solids or liquids under pressure.

Still another object is to provide a leadthrough system which is fully demountable and allows convenient replacement of samples, using an appropriate fibre splicing method.

The invention is based on the principle of appreciably incrasing the frictional resistance between the plastics material, into which the optical fibres are embedded, and the wall of the surrounding plug member as well as the wall of grooves of a conical wedge member carrying the fibres; such walls covering a much larger total friction area than that available in similar leadthrough devices and making it possible to use the leadthrough of the invention in pressure differentials of up to 200 Pa, without damaging the fibres.

The use of a conical wedge member also has the appreciable advantage of dividing the fibre blow-out force, created by the hydrostatic pressure, into a component still having the blow-out effect but of a much smaller magnitude acting lengthwise of the grooves of the wedge member, and another component normal to the grooves which increases the frictional force resisting of the blow-out force.

More specifically, the invention is a method of laying out a plurality of optical fibres across an aperture through a wall, preferably the shell of a container, separating a high pressure zone from a low pressure zone, the method comprising the steps of: providing a plug member and forming a fibre passage axially through the plug member; the passage having a conical first portion and a second portion opening into the conical portion, at the apex thereof; providing an essentially conical wedge member having a size suitable for fitting into the conical portion; forming a plurality of grooves on the outer surface of the wedge member to extend between the base and the apex thereof, and unattachedly inserting the wedge member in the conical portion so that the grooves open into the second passage portion; dividing the optical fibres into fractions of at least one fibre and feeding each fraction individually into one of the grooves and collectively into the second passage portion; introducing a plastics material in the grooves and in the second passage portion to embed the fibres completely and for the plastics material to adhere to the surfaces of the grooves and to the surfaces of the conical and second portions of the passage of the plug member, and sealingly mounting the plug member across the wall aperture with the base of the wedge member facing the high pressure zone.

The invention relates also to a leadthrough system for optical fibres, the system comprising: a plug member formed with an axial through fibre passage having a conical first portion and a second portion opening into the conical portion at the apex thereof; an essentially conical wedge member having a size suitable for fitting into the conical portion, the wedge member being formed with a plurality of grooves on the outer surface thereof, the grooves extending between the base and the apex thereof; the wedge member being inserted into the conical first passage portion with the grooves opening into the second passage portion; a plurality of optical fibres divided into fractions of at least one fibre; each fraction being received individually into one of the grooves and the fractions being received collectively into the second passage portion, and plastics material in the grooves and in the straight passage portion completely embedding the fibres and adhering to the surfaces of the grooves and of the passage portions.

The conical passage of the plug member and the wedge should preferably have an apex angle of about 35°.

Each groove should preferably have a cross-sectional area close to twice that of all fibres in the groove, the ratio of the cross-sections of all fibres in a groove to the cross-section of said groove being advantageously ranging between 50% and 60%.

Other features and advantages of the invention will become apparent from the description that follows of two preferred embodiments having reference to the appended drawings.

DESCRIPTION OF THE PREFERRED EMBODIMENT

Figure 1:
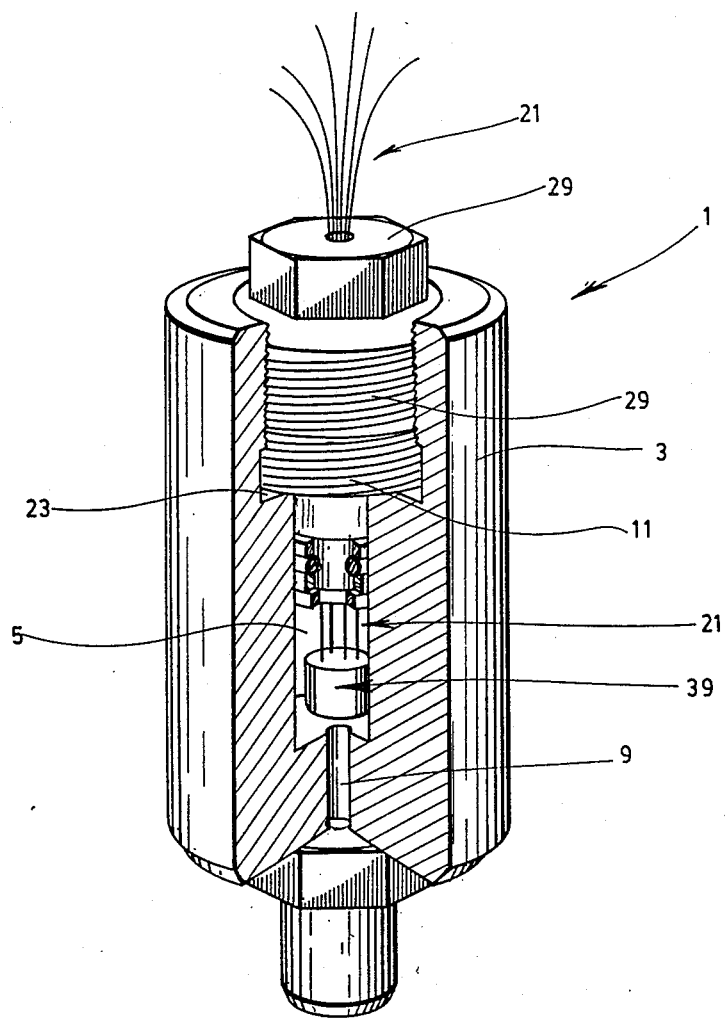
FIG. 1 is a perspective view, partially torn away to illustrate the inner structure, of a sample-investigating pressure container with a leadthrough system made according to the invention.
Figure 2:
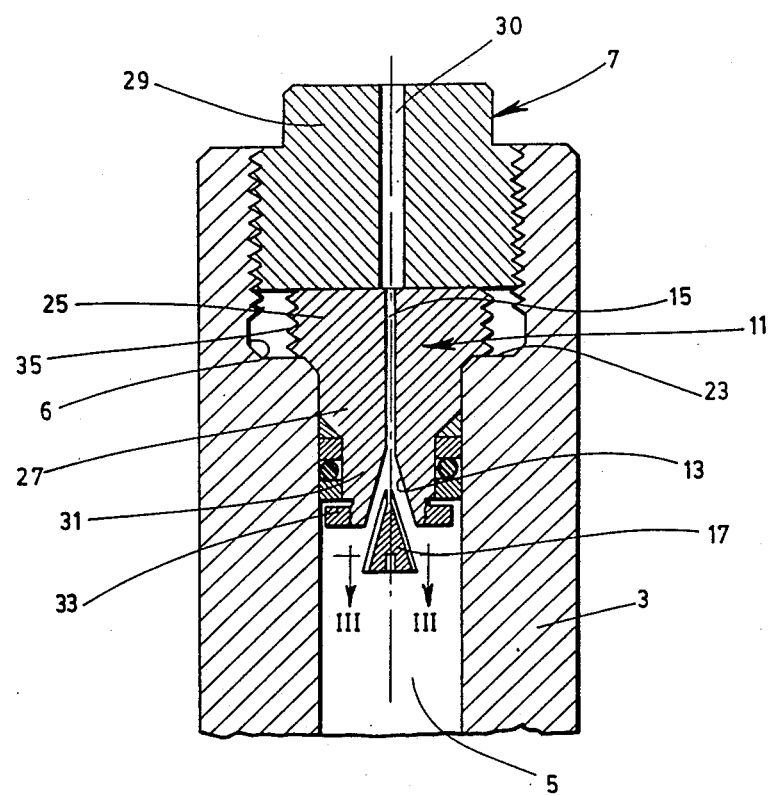
FIG. 2 is an axial cross-sectional view of the top portion of the container of FIG. 1.

FIGS. 1 and 2 show a pressure container or vessel 1 of which the shell 3 defines a high pressure chamber 5 having an aperture 6 at one end closed by a leadthrough system 7 made according to the invention while the opposite end is formed with a passage 9 for introducing hydrostatic pressure into the chamber 5. The shown vessel or container 1 has a small size but it will be appreciated that the leadthrough system 7 may also be applied to the bulkhead of pressure vessels of any large sizes. The environmental pressure outside the vessel will usually be atmospheric pressure.

The leadthrough system 7 comprises a plug member 11 through which is formed an axial optical-fibre passage made up of a conical portion 13,at its end facing the high pressure chamber 5, and a straight portion 15 of constant cross-section at its other end or low pressure end; the latter opening into the former at its apex, as shown.

Figure 3:
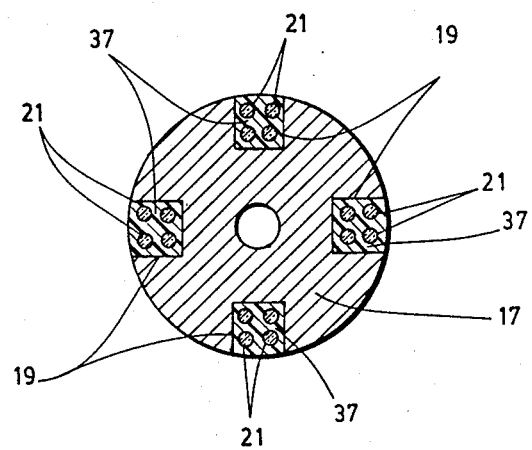
FIG. 3 is a cross-sectional view, on an enlarged scale, taken along line III—III of FIG. 2.

Made to fit into the conical passage portion 13 is a conical wedge member 17 which has a size for suitably fitting it freely into the conical portion 13; FIG. 2 showing it as about to be inserted. As best illustrated in FIG. 3, the outer surface of the wedge member 17 is cut with four grooves 19 running between the wedge base and the wedge apex where they open into the lower end of the straight passage portion 15.

The aperture 6 through the shell 3 has an inner bore which merges with the wall of the high pressure chamber 5 and an outer counterbore; the two bores defining a radial shoulder 23 between them. The plug member 11, on the other hand, has a wide outer end 25 seating on the shoulder 23 and a slimmer inner end 27 snugly fitting into the bore of the aperture 6 which merges with that of the chamber 5. The plug member 11 is secured in the aperture 6 by an outwardly threaded solid cap 29 screwed into the counterbore of the aperture 6 and clamping the plug member 11 against the shoulder 23. It is formed with a central passage 30 coaxial with the passage portion 15 of the plug 11.

The inner end 27 of the plug member 11 terminates into a smaller diameter tip 31 separated from the bore of the aperture 6 by a sealing assembly of conventional type which can be made up of a sealing O-ring having a solid metal ring of square cross-section on either side and a triangular metal ring between the inner end 27 and the tip 31. A nut 33 of smaller diameter than the bore of the chamber 5, may be screwed on a small extension of the tip 31 to hold the sealing assembly when being mounted. Pressure from the high pressure chamber 5 is applied to the sealing assembly by flowing around the nut 33. The upper end 25 of the plug member 11 is outwardly threaded, at 35 as shown , so that it may be screwed in a tubular inwardly threaded tool when it is desired to remove the plug member.

The optical fibres 21 to be layed out are, in this realization, divided into four fractions of four fibres and each fraction is fed into one of the grooves 19, individually, and the fractions are thereafter collectively fed in the first passage portion 11. After being properly positioned, plastics material 37 is injected into the grooves 19 and the second passage portion 15 to embed the fibres completely and so as to cause the plastics material to adhere to their surfaces. The plastics material 37 may advantageously be an epoxy resin of the type 10–347 GC Electronics.

Applicants have found that the system had a particularly good reliability when the conical passage portion 13 of the plug 11 and the wedge member 17 had an apex angle of about 35° and with the fibres 21 stripped of any protective coating. Also, for better results, it is found that each groove 19 should have a square cross-section and a cross-sectional area about twice the cross-section area of all fibres received into it. The ratio of the fibres cross-sections in one groove over the groove cross-section itself should be between 50% and 60%. With a leadthrough system as disclosed above, it is possible to allow the passage of up to 20 separate optical fibres.

As opposed to known fibre-optic window filled with a set of lightguides and sealed permanently, applicants' system is fully dismountable and allows quick and convenient replacement of sensors and/or other samples investigated inside the chamber, such as samples 39 in FIG. 1. Considering that a large number of optical fibres are used, the failure of some of them would not necessarily mean the failure of the whole experiment as would be the case with one-fibre systems. Although the system disclosed herein can carry virtually any type of fibres, special attention must be paid to avoid thermal and/or pressure induced stresses which would be particularly critical in the case of phase-sensitive applications. Careful analysis of thermal and mechanical properties of all materials involved would then become necessary.

Applicants' system has been tested for pressures up to 200 MPa. Applying several short-term pressure cycles, assembling or disassembling of the system did not cause any visible damage to the fibres and the system as a whole which was found to be very reliable.

In applicants' judgement, the system herein disclosed could be of considerable interest not only for sensing applications but also in the area of many optical investigations of solids under pressure such as band structure, transmission properties, etc.

Figure 4:
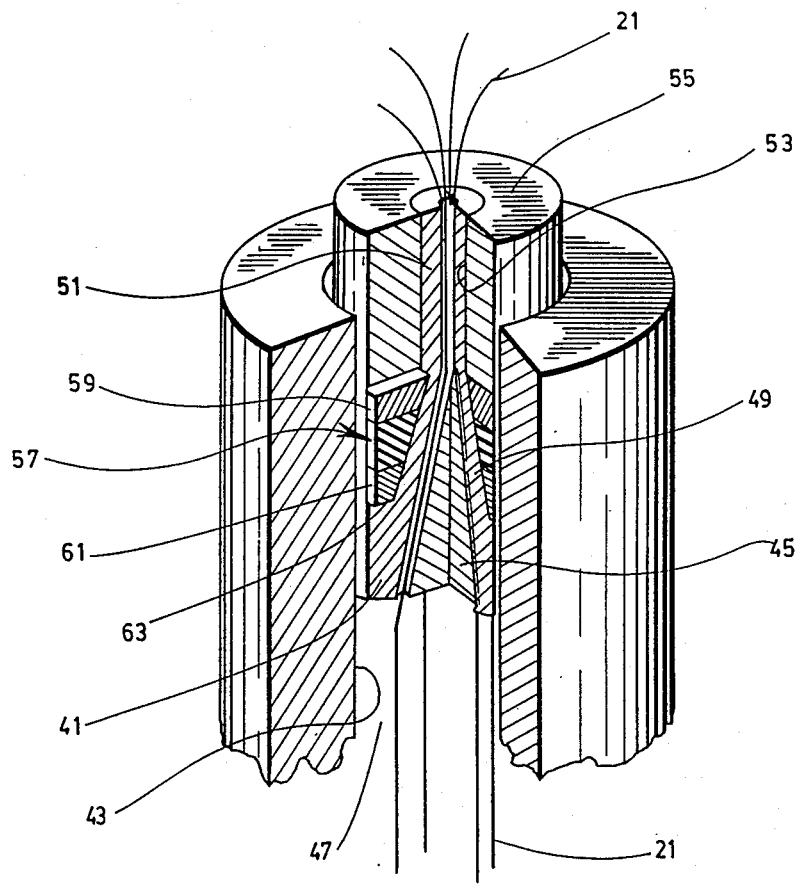
FIG. 4 is a view similar to that of FIG. 1 but of a modified form of leadthrough system.

In the embodiment of FIG. 4, the plug member 41 is slidably fitted in the shell aperture 43 with the base of the wedge member 45 facing the high pressure chamber 47 which may contain a liquid or a gas, for instance. The plug member 41 has a central outwardly conical part 49 which extends, at its upper end, into a tubular portion 51 slidable into a cylindrical bore 53 of a piston 55. The sealing assembly 57, of the same type as in FIGS. 1 and 2, is disposed between a top compression metal ring 59 and a bottom compression metal ring 61, the latter resting on an outwardly radial shoulder 63 of the plug member 41. The aligned bores of the top ring 59, the sealing assembly 57 and the bottom ring 61 are formed to match the outer conicity of the conical part 49 of the plug member 41. With this arrangement, it will be appreciated that axial pressure, along the arrow in FIG. 4, applied over the piston 55 will raise the hydrostatic pressure in the liquid or the gas in chamber 47.

We claim:

1. A method of laying out a plurality of optical fibres across an aperture through a wall separating a high pressure zone and a low pressure zone from one another, said method comprising the steps of:
    providing a plug member and forming a fibre passage axially through said plug member; said passage having a conical first portion and a second portion opening into said conical portion, at the apex thereof;
    providing an essentially conical wedge member having a size suitable for fitting into said conical portion; forming a plurality of grooves on the outer surface of said wedge member to extend between the base and the apex thereof, and unattachedly inserting said wedge member in said conical portion so that said grooves open into said second passage portion;
    dividing said optical fibres into fractions of at least one fibre and feeding each fraction individually into one of said grooves and collectively into said second passage portion;
    introducing a plastics material in said grooves and in said second passage portion to embed said fibres completely and for said plastics material to adhere to the surfaces of said grooves and to the surfaces of said conical and second portions of said passage of said plug member, and
    sealingly mounting said plug member across said wall aperture with the base of said wedge member facing said high pressure zone.

2. A method as claimed in claim 1, including selecting, for said conical wedge member and for said conical passage, an apex angle of about 35°.

3. A method as claimed in claim 2, including selecting grooves having a cross-sectional area equal to at least twice that of all fibres passing through them.

4. A method as claimed in claim 3, forming grooves having a square cross-section.

5. A method as claimed in claim 2, including selecting the ratio of the cross-sections of all fibres in one groove over the cross-section of the said one groove to be between 50% and 60%.

6. A method as claimed in claim 1, including removably securing said plug member to said wall with the base of said wedge member facing said high pressure zone.

7. A method as claimed in claim 1, including:
    slidably fitting said plug member into said wall aperture with the base of said wedge member facing said high pressure zone, and
    applying an axial force to said plug member from said low pressure zone to pressurize said high pressure zone.

8. A method as claimed in claim 1, wherein said second passage portion has a constant cross-section.

9. A leadthrough system for optical fibres, said system comprising:
    a plug member formed with an axial through fibre passage having a conical first portion and a second portion opening into said conical portion at the apex thereof;
    an essentially conical wedge member having a size suitable for fitting into said conical portion, said wedge member being formed with a plurality of grooves on the outer surface thereof, said grooves extending between the base and the apex thereof; said wedge member being inserted into said conical first passage portion with said grooves opening into said second passage portion;
    a plurality of optical fibres divided into fractions of at least one fibre; each fraction being received individually into one of said grooves and said fractions being received collectively into said second passage portion, and
    plastics material in said grooves and in said straight passage portion completely embedding said fibres and adhering to the surfaces of said grooves and of said passage portions.

10. A system as claimed in claim 9, wherein said conical passage and said wedge member have an apex angle of about 35°.

11. A system as claimed in claim 10, wherein the cross-sectional area of each groove is close to twice that of all fibres in that groove.

12. A system as claimed in claim 11, wherein said grooves have preferably a square cross-section.

13. A system as claimed in claim 10, wherein the ratio of the cross-sections of all fibres in one groove over the cross-section of the said one groove is between 50% and 60%.

14. A system as claimed in claim 9, in combination with a pressure container having a shell defining an inner high pressure chamber and being formed with an aperture therethrough, said combination further comprising:

means mounting and removably securing said plug member in said shell aperture with the base of said wedge member facing said high pressure chamber, and sealing means between said conical plug and said shell.

15. A system as claimed in claim 9, in combination with a pressure container having a shell defining an inner high pressure chamber and being formed with an aperture therethrough, said plug member being slidably mounted in said shell aperture with the base of said wedge member facing said high pressure chamber; said combination further comprising sealing means between said conical plug member and said shell.

16. A system as claimed in claim 9, wherein said second passage portion has a constant cross-section.

17. A system as claimed in claim 9, wherein said plastics material is an epoxy resin.

* * * * *